US011947252B2

United States Patent
Weng et al.

(10) Patent No.: US 11,947,252 B2
(45) Date of Patent: Apr. 2, 2024

(54) OPTICAL MEMBER DRIVING MECHANISM INCLUDING MATRIX STRUCTURE CORRESPONDS TO NOISE

(71) Applicant: TDK TAIWAN CORP., Taoyuan (TW)

(72) Inventors: Chih-Wei Weng, Taoyuan (TW);
Juei-Hung Tsai, Taoyuan (TW);
Shu-Shan Chen, Taoyuan (TW);
Mao-Kuo Hsu, Taoyuan (TW);
Sin-Jhong Song, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 0 days.

(21) Appl. No.: 18/083,137

(22) Filed: Dec. 16, 2022

(65) Prior Publication Data
US 2023/0122825 A1 Apr. 20, 2023

Related U.S. Application Data

(63) Continuation of application No. 16/740,690, filed on Jan. 13, 2020, now Pat. No. 11,556,047.
(Continued)

(30) Foreign Application Priority Data

Dec. 20, 2019 (EP) .................................. 19218896

(51) Int. Cl.
*G03B 5/00* (2021.01)
*G02B 7/02* (2021.01)
(Continued)

(52) U.S. Cl.
CPC .............. *G03B 5/00* (2013.01); *G02B 7/021* (2013.01); *G02B 7/08* (2013.01); *G02B 7/09* (2013.01); *G02B 7/10* (2013.01); *G02B 9/62* (2013.01); *G02B 13/001* (2013.01); *G02B 13/0065* (2013.01); *G02B 27/646* (2013.01); *G03B 13/36* (2013.01); *H04N 23/54* (2023.01); *H04N 23/55* (2023.01); *H04N 23/57* (2023.01); *H04N 23/687* (2023.01); *G03B 2205/0007* (2013.01);
(Continued)

(58) Field of Classification Search
CPC .. G03B 5/00; G03B 13/36; G03B 2205/0007; G02B 7/021; G02B 7/08; G02B 7/09; G02B 7/10; G02B 9/62; G02B 13/001; G02B 13/0065; G02B 27/646; H04N 23/54; H04N 23/55; H04N 23/57; H04N 23/687
See application file for complete search history.

(56) References Cited

U.S. PATENT DOCUMENTS 6,116,792 A 9/2000 Kosugi
7,068,448 B2 * 6/2006 Huang .................... G02B 3/00
359/822
(Continued)

*Primary Examiner* — Luong T Nguyen
(74) *Attorney, Agent, or Firm* — MUNCY, GEISSLER, OLDS & LOWE, PC

(57) ABSTRACT

An optical member driving mechanism is provided. The optical member driving mechanism includes a first portion and a matrix structure. The first portion is connected to a first optical member and corresponds to a first light. The matrix structure is disposed on the first portion and corresponds to a second light, wherein the first light is different from the second light. The matrix structure includes a regularly-arranged structure.

19 Claims, 9 Drawing Sheets

Related U.S. Application Data

(60) Provisional application No. 62/887,905, filed on Aug. 16, 2019.

(51) Int. Cl.
*G02B 7/08* (2021.01)
*G02B 7/09* (2021.01)
*G02B 7/10* (2021.01)
*G02B 9/62* (2006.01)
*G02B 13/00* (2006.01)
*G02B 27/64* (2006.01)
*G03B 13/36* (2021.01)
*H04N 23/54* (2023.01)
*H04N 23/55* (2023.01)
*H04N 23/57* (2023.01)
*H04N 23/68* (2023.01)

(52) U.S. Cl.
CPC ........... *G03B 2205/0053* (2013.01); *G03B 2205/0069* (2013.01)

(56) References Cited

U.S. PATENT DOCUMENTS

| | | | |
|---|---|---|---|
| 7,616,250 B2 * | 11/2009 | Watanabe | H01L 27/14627 |
| | | | 257/434 |
| 8,616,801 B2 | 12/2013 | Morrison et al. | |
| 11,556,047 B2 * | 1/2023 | Weng | G03B 30/00 |
| 2006/0018036 A1 | 1/2006 | Huang | |
| 2006/0023108 A1 | 2/2006 | Watanabe et al. | |
| 2015/0185366 A1 | 7/2015 | Bone et al. | |
| 2018/0095204 A1 | 4/2018 | Lin et al. | |
| 2018/0188471 A1 | 7/2018 | Kim | |
| 2020/0081321 A1 * | 3/2020 | Tseng | G03B 17/17 |

* cited by examiner

OPTICAL MEMBER DRIVING MECHANISM INCLUDING MATRIX STRUCTURE CORRESPONDS TO NOISE

CROSS REFERENCE TO RELATED APPLICATIONS

This application a Continuation of pending U.S. patent application Ser. No. 16/740,690, filed Jan. 13, 2020 and entitled "OPTICAL MEMBER DRIVING MECHANISM" with "OPTICAL MEMBER DRIVING MECHANISM INCLUDING MATRIX STRUCTURE THAT CORRESPONDS TO NOISE", which claims the benefit of U.S. Provisional Application No. 62/887,905, filed Aug. 16, 2019, and claims priority of European Patent Application No. 19218896.9, filed Dec. 20, 2019, the entirety of which are incorporated by reference herein.

BACKGROUND

Technical Field

The disclosure relates to an optical member driving mechanism, and in particular to an optical member driving mechanism including a matrix structure that corresponds to the noise.

Description of the Related Art

With the development of technology, many electronic devices (such as smartphones and digital cameras) nowadays perform the functions of a camera or video recorder. The use of such electronic devices has become increasingly widespread, and these electronic devices have been designed for convenience and miniaturization to provide users with more choice.

Electronic devices with camera or video functionality usually have a lens driving module disposed therein to drive a lens to move along an optical axis. Therefore, an autofocus (AF) and/or optical image stabilization (OIS) function may be achieved. Light may pass through the lens and form an image on a photosensitive member.

However, during the formation of an optical image, external noise usually enters the photosensitive member due to reflection. As a result, image quality usually fails to meet users' requirements on image quality. Therefore, how to solve the aforementioned problem has become an important topic.

BRIEF SUMMARY

The present disclosure provides an optical member driving mechanism. The optical member driving mechanism includes a first portion and a matrix structure. The first portion is connected to a first optical member and corresponds to a first light. The matrix structure is disposed on the first portion and corresponds to a second light, wherein the first light is different from the second light. The matrix structure includes a regularly-arranged structure.

In an embodiment, the traveling direction of the first light is different from the traveling direction of the second light. In an embodiment, the matrix structure is symmetric about an optical axis of the first optical member. In an embodiment, the matrix structure is curved. In an embodiment, the first portion has a fillet structure, and the matrix structure is disposed on the fillet structure.

In an embodiment, the optical member driving mechanism further includes: a second portion that is movable relative to the first portion; a driving assembly configured to drive the second portion to move relative to the first portion; and another matrix structure disposed on the second portion. In an embodiment, the second light is reflected by the matrix structure. In an embodiment, the matrix structure includes a multi-layered structure, and the multi-layered structure includes a metallic material and an insulating material.

In an embodiment, the first portion includes a base, a housing disposed on the base, and a frame disposed between the base and the housing, the base has a barrier, and the frame has a light-shielding structure opposite to the barrier. In an embodiment, a jagged structure is formed on the barrier or the light-shielding structure. In an embodiment, the matrix structure is conformally disposed on the jagged structure. In an embodiment, an opening is formed on a sidewall of the housing, and the barrier or the light-shielding structure is exposed in the opening when viewed in a direction perpendicular to the sidewall of the housing. In an embodiment, the barrier has an upper surface and a cutting surface that intersects with the upper surface, a tapered structure is formed by the upper surface and the cutting surface, and the matrix structure is formed on the upper surface.

In an embodiment, the matrix structure includes: a metallic layer; an insulating layer on the metallic layer; and a plurality of protruding portions on the insulating layer. In an embodiment, the metallic layer comprises gold (Au), silver (Ag), aluminum (Al), or a combination thereof. In an embodiment, the insulating layer comprises magnesium fluoride ($MgF_2$), silicon dioxide ($SiO_2$), or a combination thereof. In an embodiment, the metallic layer and the protruding portions are formed of the same material. In an embodiment, the metallic layer and the protruding portion are formed of different materials. In an embodiment, the protruding portions have different sizes. In an embodiment, a thickness of the metallic layer is different from a thickness of the insulating layer.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side.

It should be understood that although the terms "first," "second," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
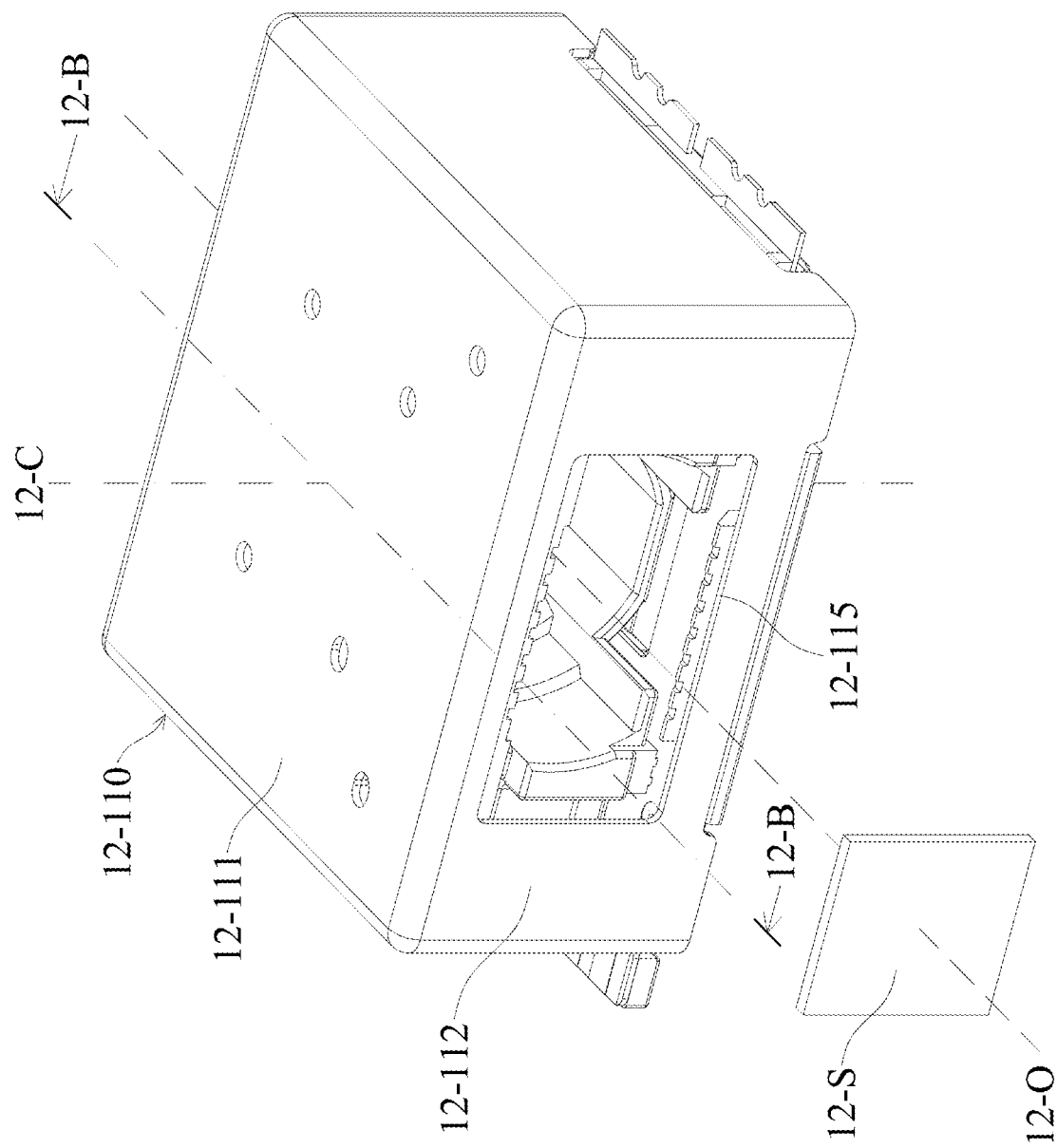
FIG. 1 is a perspective view illustrating an optical member driving mechanism in accordance with an embodiment of the present disclosure.

FIG. 1 is a schematic perspective view illustrating an optical member driving mechanism 12-101 in accordance with an embodiment of the present disclosure. It should be noted that, in this embodiment, the optical member driving mechanism 12-101 may be, for example, disposed in the electronic devices with camera function for driving an optical member (not shown), and can perform an autofocus (AF) and/or optical image stabilization (OIS) function.

Figure 3:
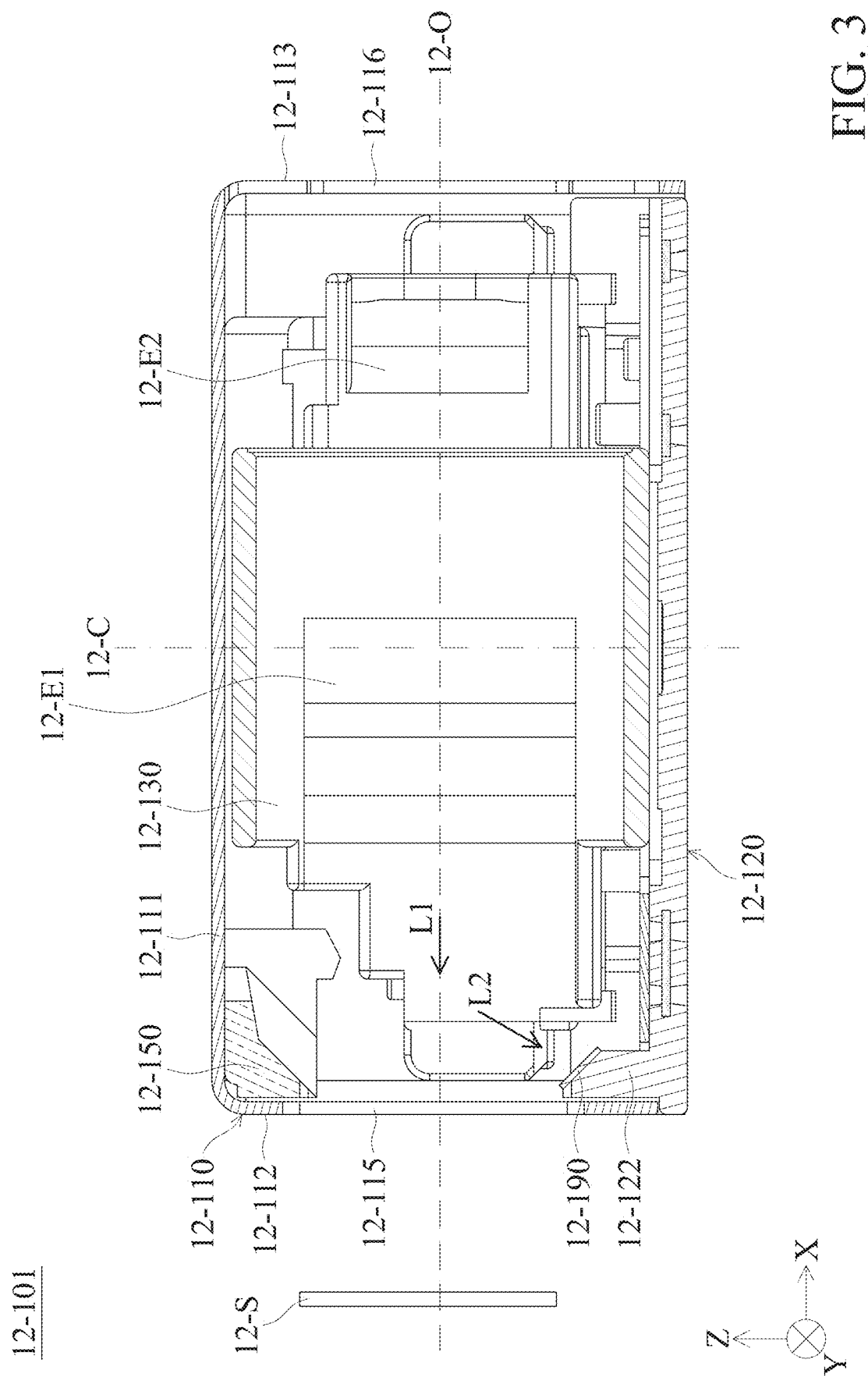
FIG. 3 is a cross-sectional view illustrating along line 12-B shown in FIG. 1.

As shown in FIG. 1, the optical member driving mechanism 12-101 has a central axis 12-C that is substantially parallel to the Z axis. The optical member has an optical axis 12-O that is substantially parallel to the X axis. In other words, in the present embodiment, the central axis 12-C is substantially perpendicular to the optical axis 12-O. The optical member driving mechanism 12-101 includes a housing 12-110 which has a top surface 12-111, a first side surface 12-112 and a second side surface 12-113 (as shown in FIG. 3) that is opposite to the first side surface 12-112. The top surface 12-111 extends in a direction that is parallel to the optical axis 12-O (i.e. the X-Y plane). The first side surface 12-112 and the second side surface 12-113 extend from edges of the top surface 12-111 in a direction (the Z axis) that is perpendicular to the optical axis 12-O. In other words, in the present embodiment, the first side surface 12-112 and the second side surface 12-113 are substantially parallel to each other. In some embodiments, the first side surface 12-112 and the second side surface 12-113 extend from the edges of the top surface 12-111 in a direction that is not parallel to the optical axis O.

In addition, the housing 12-110 has a rectangular first opening 12-115 that is located on the first side surface 12-112, and the optical axis 12-O may pass through the first opening 12-115. The light may pass through a first optical member 12-E1 and a second optical member 12-E2 which are disposed in the housing 12-110. After the light passes through the first optical member 12-E1 and the second optical member 12-E2, it will travel to an optical member 12-S that is disposed outside of the housing 12-110. That is, the optical member 12-S corresponds to the first opening 12-115 of the housing 12-110. For example, the optical member 12-S is an image sensor, and thereby an image may be generated on the above electronic devices. It should be appreciated that any suitable element (not shown) may be connected between the housing 12-110 and the optical member 12-S in order to maintain the stability of the optical member 12-S for generating an image. In the present embodiment, when viewed along the optical axis 12-O (namely, the direction in which the first optical member 12-E1 and the second optical member 12-E2 are arranged), the optical member 12-S and the optical members 12-E1 and 12-E2 which are located inside the housing 12-110 at least partially overlap. In addition, when viewed in a direction (e.g. the central axis 12-C) that is perpendicular to optical axis 12-O, the optical member 12-S and the optical members 12-E1 and 12-E2 which are located inside the housing 12-110 do not overlap.

Figure 2:
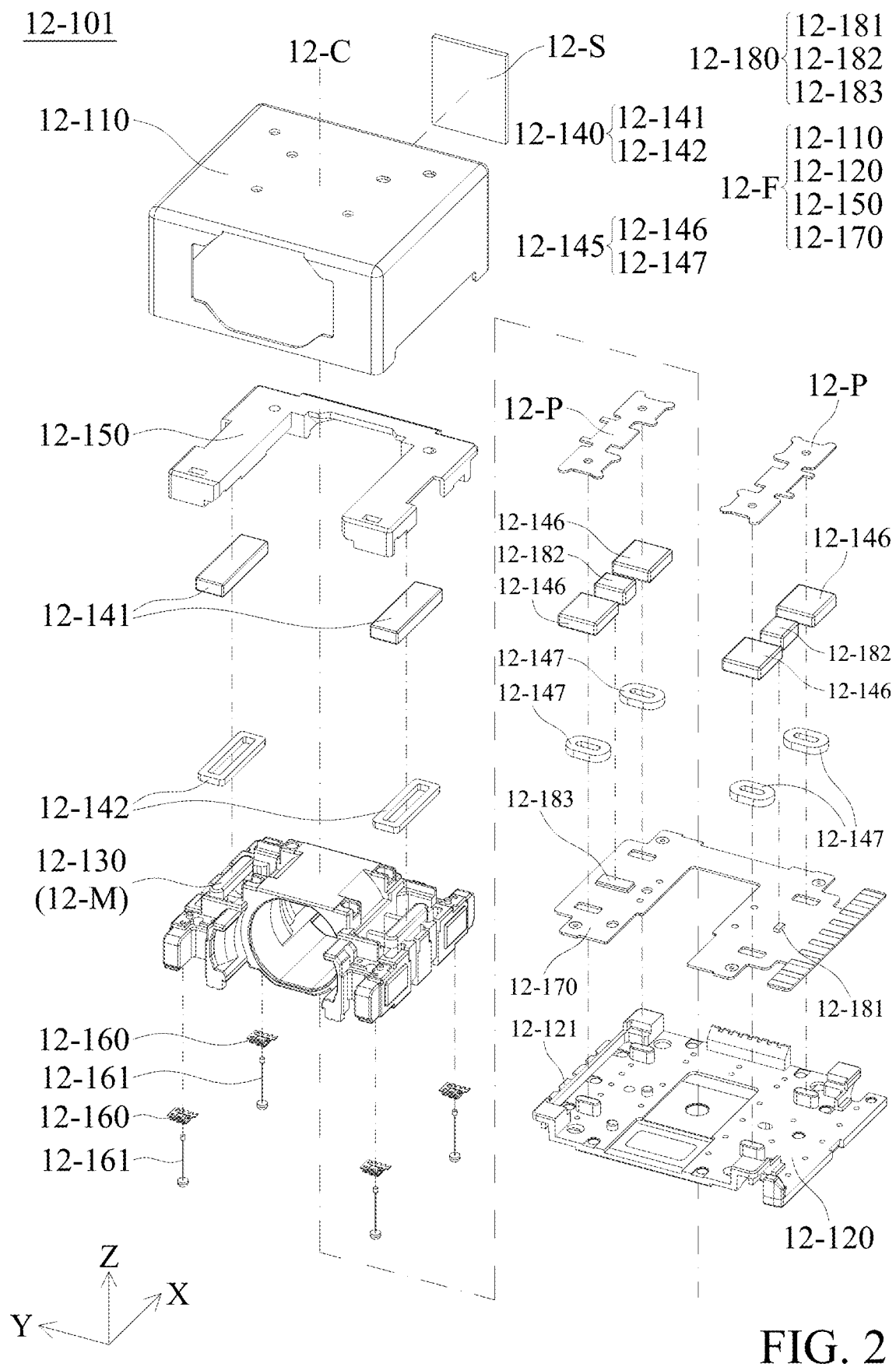
FIG. 2 is an exploded view illustrating the optical member driving mechanism shown in FIG. 1.

FIG. 2 is an exploded view illustrating the optical member driving mechanism 12-101 shown in FIG. 1. In the present embodiment, the housing 12-110 of the optical member driving mechanism 12-101 has a substantial rectangular structure. The optical member driving mechanism 12-101 mainly includes a fixed portion 12-F (e.g. a first portion), a movable portion 12-M (e.g. a second portion), a plurality of first elastic members 12-160, a plurality of second elastic members 12-161, a first electromagnetic driving assembly 12-140 and a second electromagnetic driving assembly 12-145. The fixed portion 12-F includes a housing 12-110, a base 12-120, a frame 12-150, and a circuit component 12-170.

The housing 12-110 is disposed on the base 12-120, and protect the elements disposed inside the optical member driving mechanism 12-101. In some embodiments, the housing 12-110 is made of metal or another material with sufficient hardness to provide good protection. The frame 12-150 is disposed in and affixed to the housing 12-110. The circuit component 12-170 is disposed on the base 12-120 for transmitting electric signals, performing the autofocus (AF) and/or optical image stabilization (OIS) function. For example, the optical member driving mechanism 12-101 may control the position of the optical member based on the aforementioned electric signals so as to form an image. In the present embodiment, a metallic member 12-121 is disposed in the base by insert molding, and thereby the structural strength of the base 12-120 may be enhanced.

The movable portion 12-M is movable relative to the fixed portion 12-F. The movable portion M mainly includes a carrier 12-130 which carries an optical member. As shown in FIG. 2, the carrier 12-130 is movably connected to the housing 12-110 and the base 12-120. The first elastic members 12-160 are disposed on the carrier 12-130. The second elastic members 12-161 extend in a vertical direction (the Z axis), and are connected to the first elastic members 12-160 and the base 12-120. As a result, the carrier 12-130 may be connected to the base 12-120 via the first elastic members 12-160 and the second elastic members 12-161. For example, the first elastic members 12-160 and the second elastic members 12-161 are made of metal or another suitable elastic material.

The first electromagnetic driving assembly 12-140 includes first magnetic members 12-141 and first coils 12-142. The first magnetic members 12-141 may be disposed on the frame 12-150, and the corresponding first coils 12-142 are disposed on the carrier 12-130. When current is applied to the first coils 12-142, an electromagnetic driving force may be generated by the first coils 12-142 and the first magnetic members 12-141 (i.e. the first electromagnetic driving assembly 12-140) to drive the carrier 12-130 and the optical member carried therein to move along a horizontal direction (the X-Y plane) relative to the base 12-120, performing the autofocus (AF) and/or optical image stabilization (OIS) function.

In addition, the second electromagnetic driving assembly 12-145 includes second magnetic members 12-146 and second coils 12-147. The second magnetic members 12-146 may be disposed on the carrier 12-130, and the corresponding second coils 12-147 are disposed on the base 12-120. For example, the second coils 12-147 may be flat-plate coils such that the difficulty and the required time for assembly may be reduced. When a current is applied to the second coils 12-147, an electromagnetic driving force may be generated by the second electromagnetic driving assembly 12-145 to drive the carrier 12-130 and the optical member carried therein to move along the optical axis O (the X axis) relative to the base 12-120, performing the autofocus (AF) function. The carrier 12-130 may be movably suspended between the frame 12-150 and the base 12-120 by the electromagnetic driving force of the first electromagnetic driving assembly 12-140, the second electromagnetic driving assembly 12-145 and the force exerted by the first elastic members 12-160, the second elastic members 12-161. Furthermore, a magnetic permeable plate 12-P is disposed on the second magnetic members 12-146 for concentrating the magnetic field of the second magnetic members 12-146 so that the efficiency of the second electromagnetic driving assembly 12-145 may be improved. In some embodiments, the magnetic permeable plate 12-P may be made of metal or another material with sufficient magnetic permeability.

The sensing assembly 12-180 includes a sensor 12-181, a reference member 12-182 and an integrated circuit (IC) component 12-183. In the present embodiment, the sensor 12-181 and the integrated circuit component 12-183 are disposed on the base 12-120, and the reference member 12-182 is disposed in the carrier 12-130. A plurality of reference members 12-182 may be disposed. For example, the reference member 12-182 is a magnetic member, the sensor 12-181 may detect the change of the magnetic field of the reference member 12-182, and the position of the carrier 12-130 (and the optical member) may be determined by the integrated circuit component 12-183. In some embodiments, the sensor 12-181 or the reference member 12-182 is disposed on the fixed portion 12-F, and the other of the sensor 12-181 or the reference member 12-182 is disposed on the movable portion 12-M.

FIG. 3 is a cross-sectional view illustrating along line B-B shown in FIG. 1. As shown in FIG. 3, the housing 12-110 has a second opening 12-116, and the optical axis 12-O may pass through the second opening 12-116. In the present embodiment, the optical member driving mechanism 12-101 has an incident end and an outlet end, wherein the incident end corresponds to the second opening 12-116, and the outlet end corresponds to the first opening 12-115. In the present embodiment, the light may enter the optical member from the incident end (i.e. the second opening 12-116) along the optical axis 12-O, and exit the optical member from the outlet end (i.e. the first opening 12-115). In the present embodiment, the frame 12-150 is disposed between the carrier 12-130 and the housing 12-110. When viewed in a direction (the X axis) that is parallel to the optical axis 12-O, the frame 12-150 and the carrier 12-130 at least partially overlap.

In addition, the base 12-120 further has a barrier 12-122 that is disposed to protrude towards the top surface 12-111. The barrier 12-122 may have a fillet structure, and when viewed along the optical axis 12-O from the first opening 12-115, the fillet structure is formed on the edge of the first opening 12-115. The optical member driving mechanism 12-101 further includes a matrix structure 12-190 that is disposed on the barrier 12-122 (such as disposed on the fillet structure of the barrier 12-122). The matrix structure 12-190 is disposed between the optical member 12-S and the optical member which is carried by the carrier 12-130. For example, a first light L1 (e.g. the desired light to form an image) entering the optical member driving mechanism 12-101 may travel along the optical axis 12-O, reach the optical member 12-S and form an image after passing through the optical member which is carried by the carrier 12-130. Furthermore, a second light L2 (such as the noise to be removed) may travel along a direction that is not parallel to the optical axis 12-O, and be reflected by the matrix structure 12-190 after passing through the optical member which is carried by the carrier 12-130, remaining inside the housing 12-110. By means of the arrangement of the matrix structure 12-190, the possibility that the second light L2 reaches the optical member 12-S may be effectively reduced, therefore preserving the image quality.

As shown in FIG. 3, the extending direction of the matrix structure 12-190 is not parallel and not perpendicular to the traveling direction (i.e. the optical axis 12-O) of the first light L1. It should be appreciated that those skilled in the art may adjust the extending direction of the matrix structure 12-190 in response to the traveling direction of the second light L2, and it will not be repeated in the following paragraphs. In the present embodiment, when viewed along the optical axis 12-O, the matrix structure 12-190 and the first opening 12-115 at least partially overlap.

Figure 4:
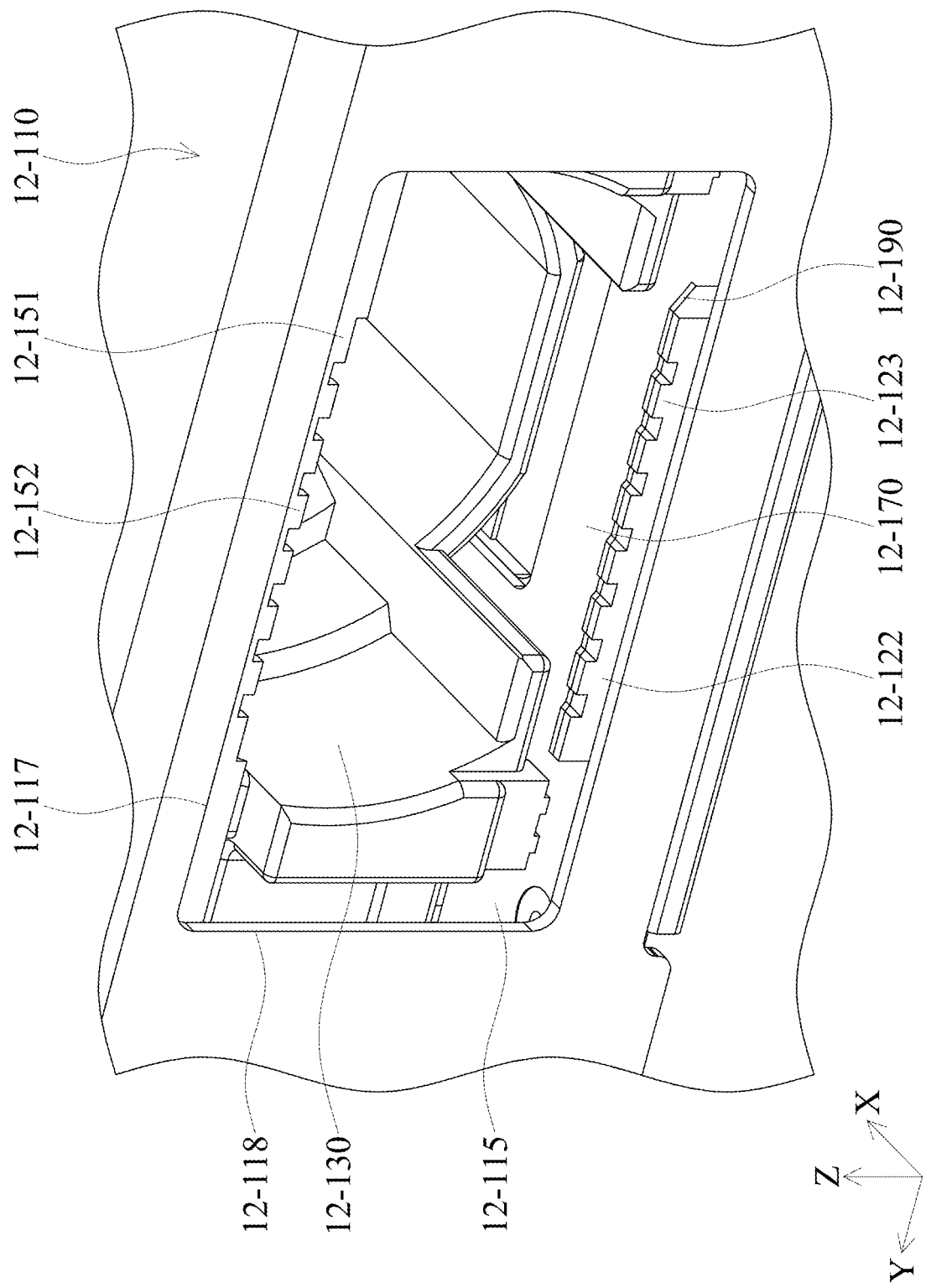
FIG. 4 is an enlarged perspective view illustrating the optical member driving mechanism shown in FIG. 1.

FIG. 4 is an enlarged perspective view illustrating the optical member driving mechanism 12-101 shown in FIG. 1 from the outlet end. As shown in FIG. 4, when viewed in a direction (the X axis) that is parallel to the optical axis 12-O, the barrier 12-122 and a lengthwise side 12-117 of the first opening 12-115 at least partially overlap, and a gap is formed between the barrier 12-122 and a widthwise side 12-118 of the first opening 12-115. In other words, when viewed in the same direction as above, the barrier 12-122 and the widthwise side 12-118 of the first opening 12-115 do not overlap. In addition, the frame 12-150 has a light-shielding structure 12-151 that is disposed to protrude towards the base 12-120. When viewed in the direction (the X axis) that is parallel to the optical axis O, the light-shielding structure 12-151 and the lengthwise side 12-117 of the first opening 12-115 also at least partially overlap. Similarly, a gap is formed between the light-shielding structure 12-151 and the widthwise side 12-118 of the first opening 12-115. In other words, when viewed in the same direction as above, the light-shielding structure 12-151 and the widthwise side 12-118 of the first opening 12-115 do not overlap.

In some embodiments, jagged structures 12-123, 12-152 may be formed on the barrier 12-122 and/or the light-shielding structure 12-151 by a laser engraving process. In some other embodiments, any other regular or irregular structure may be formed on the barrier 12-122 and/or the light-shielding structure 12-151 so as to reduce the possibility that the noise reflected in the optical member driving mechanism 12-101 enters the image sensor, enhancing the image quality. It should be noted that although the barrier 12-122 and the light-shielding structure 12-151 are both disposed in the present embodiment, it merely serves as an example. Those skilled in the art may determine whether the barrier 12-122 and/or the light-shielding structure 12-151 are disposed, or adjust the position of the barrier 12-122 and/or the light-shielding structure 12-151 as required.

Figure 5:
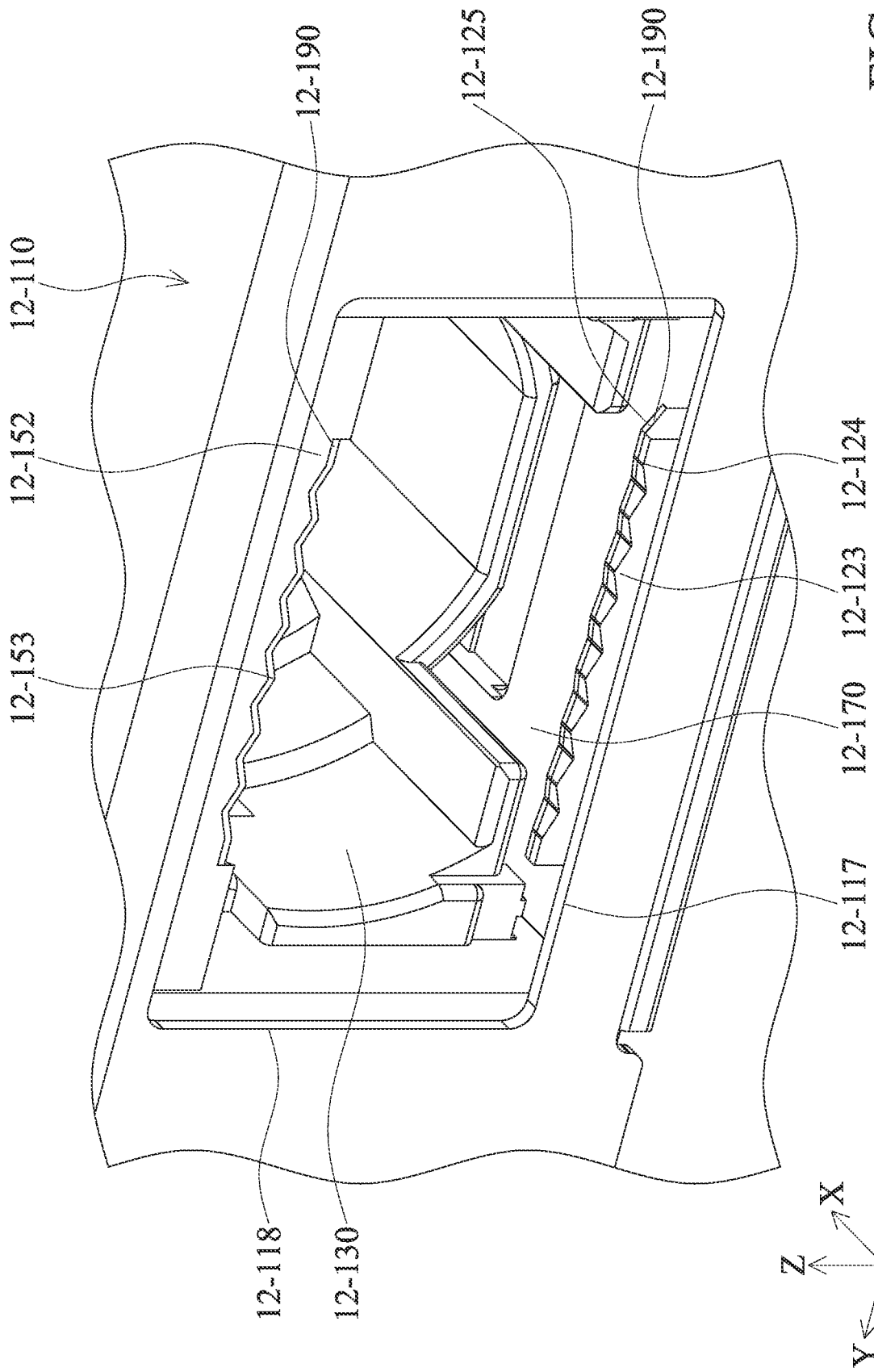
FIG. 5 is an enlarged perspective view illustrating the optical member driving mechanism in accordance with another embodiment of the present disclosure.

FIG. 5 is an enlarged perspective view illustrating the optical member driving mechanism in accordance with another embodiment of the present disclosure. In the present embodiment, the jagged structure 12-123 includes multiple tapered structure, and has a plurality of peaks 12-124. The jagged structure 12-152 also has a plurality of peaks 12-153. As shown in FIG. 5, When viewed in the direction (the X axis) that is parallel to the optical axis 12-O, the peaks 12-124, 12-153 may be exposed from the first opening 12-115. In some embodiments, the distance between the lengthwise side 12-117 of the first opening 12-115 and the peaks 12-124, 12-153 is equal to or longer than 0.25 mm, and thereby the noise may be effectively blocked, preventing the noise from entering the image sensor. In addition, the matrix structure 12-190 may be disposed on the jagged structure 12-123 and/or the jagged structure 12-152. As a result, the possibility that the noise (e.g. the second light L2 shown in FIG. 3) reaches the optical member 12-S may be further reduced, therefore preserving the image quality.

Figure 6:
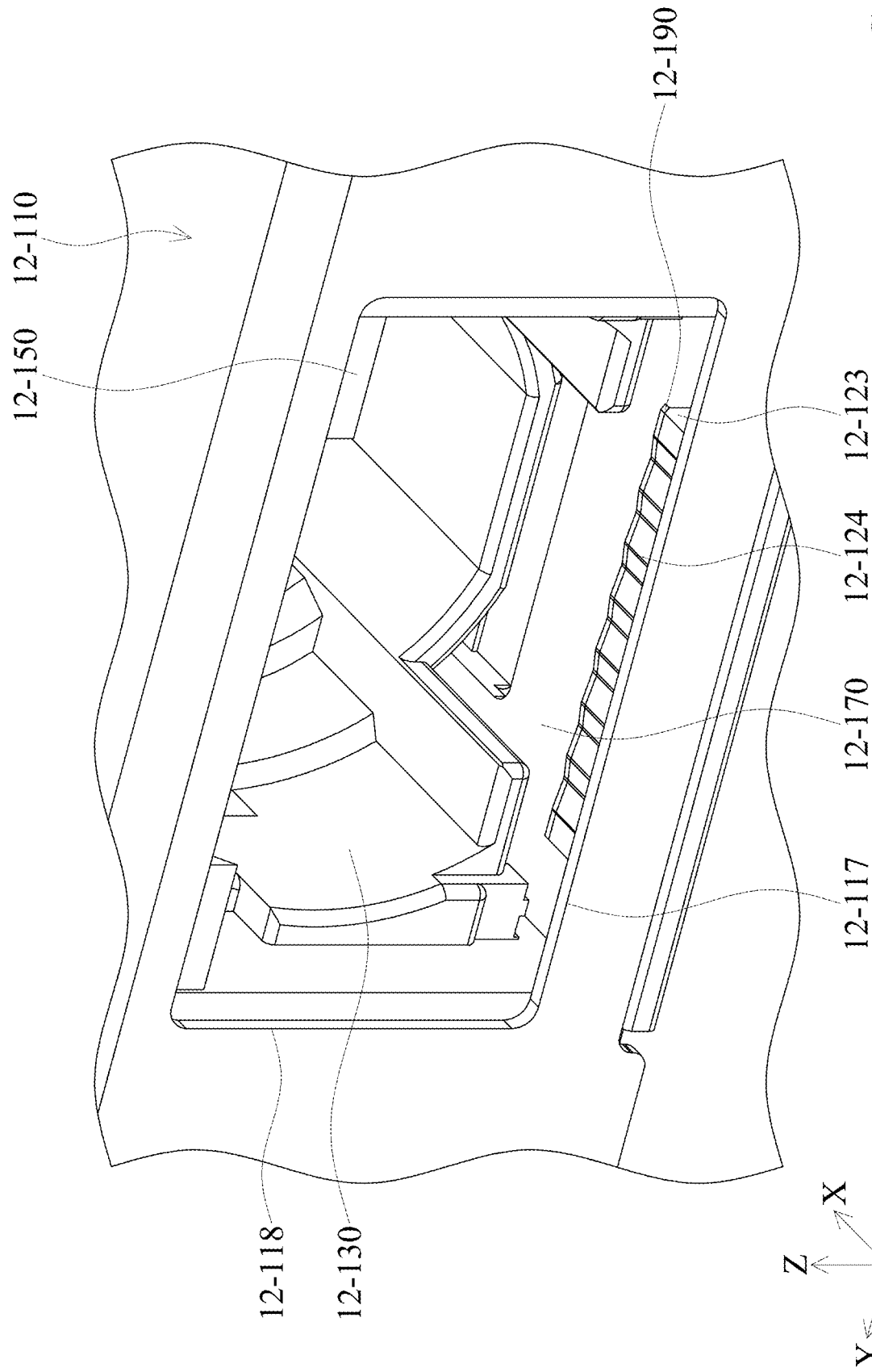
FIG. 6 is an enlarged perspective view illustrating the optical member driving mechanism in accordance with another embodiment of the present disclosure.

FIG. 6 is an enlarged perspective view illustrating the optical member driving mechanism in accordance with another embodiment of the present disclosure. As shown in FIG. 6, when viewed in the direction (the X axis) that is parallel to the optical axis 12-O, the peaks 12-124, 12-153 may not be exposed from the first opening 12-115. Namely, the peaks 12-124, 12-153 may overlap with the housing 12-110. In some embodiments, the distance between the lengthwise side 12-117 of the first opening 12-115 and the peaks 12-124, 12-153 is equal to or longer than 0.1 mm, and thereby the noise entering the image sensor may be effectively reduced. In addition, the matrix structure 12-190 may be disposed on the jagged structure 12-123 and/or the jagged structure 12-152 (as shown in FIG. 5). As a result, the possibility that the noise reaches the optical member 12-S may be further reduced, therefore preserving the image quality.

Figure 7:
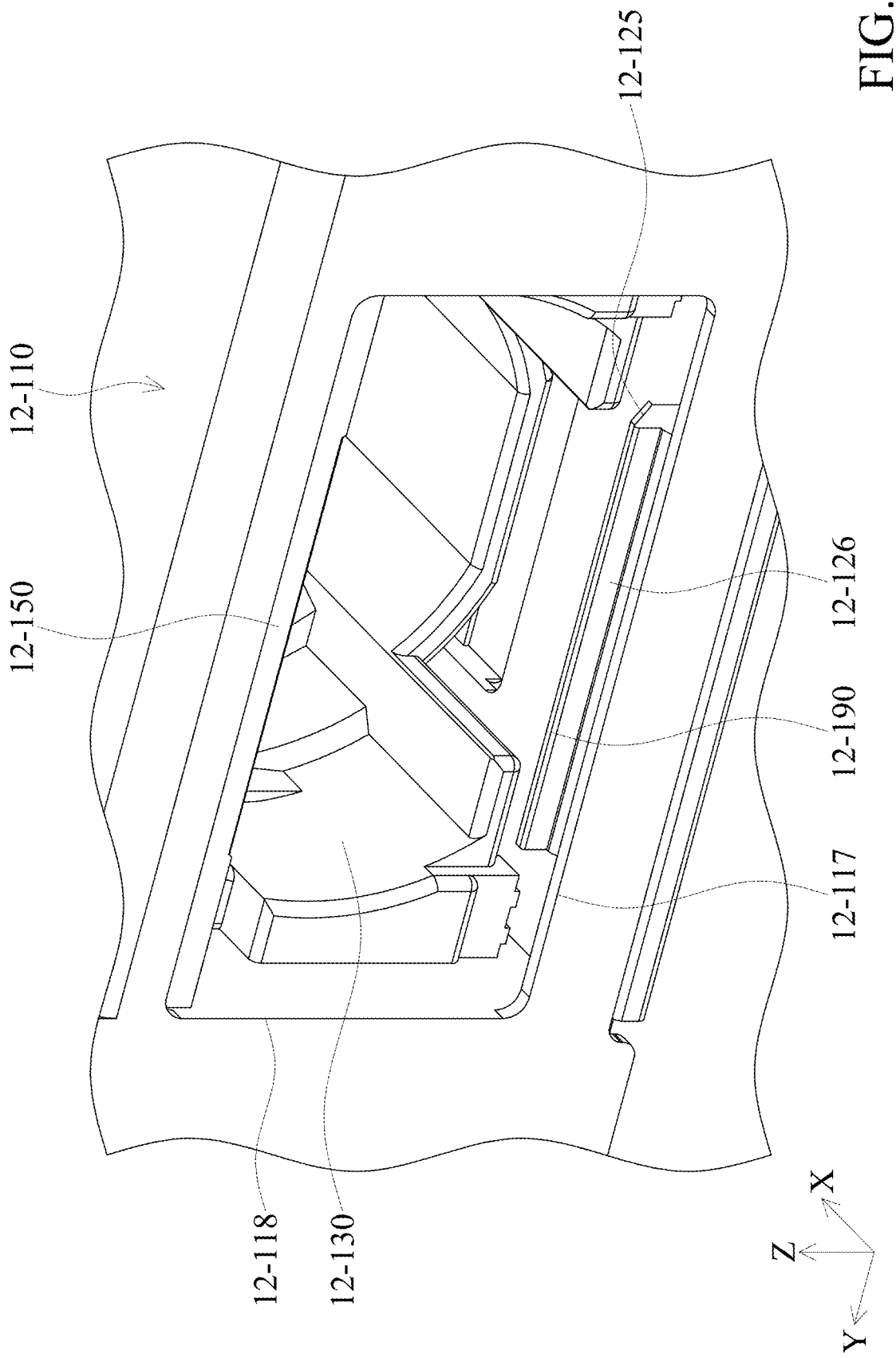
FIG. 7 is an enlarged perspective view illustrating the optical member driving mechanism in accordance with another embodiment of the present disclosure.

FIG. 7 is an enlarged perspective view illustrating the optical member driving mechanism in accordance with another embodiment of the present disclosure. In the present embodiment, the barrier 12-122 has an upper surface 12-125 and a cutting surface 12-126 that intersects with the upper surface 12-125. A tapered structure is formed by the upper surface 12-125 and the cutting surface 12-126. The upper surface 12-125 is upwardly inclined, namely facing the carrier 12-130 and the top surface 12-111. The cutting surface 12-126 is substantially perpendicular to the optical axis 12-O, facing the first side surface 12-112. In some embodiments, a fillet between the upper surface 12-125 and the cutting surface 12-126 is not greater than 0.05 mm. Similarly, the light-shielding structure 12-151 has a lower surface (not shown) and a cutting surface that intersects with the lower surface. In some embodiments, a fillet between the lower surface and the cutting surface is not greater than 0.05 mm. In addition, the matrix structure 12-190 may be disposed on the upper surface 12-125 of the barrier 12-122 and/or on the lower surface of the light-shielding structure 12-151. As a result, the possibility that the noise reaches the optical member 12-S may be further reduced, therefore preserving the image quality.

It should be understood that multiple embodiments for arranging the matrix structure 12-190 are provided as above, but these embodiments merely serve as examples without limiting the scope of the present disclosure. Those skilled in the art may arrange the matrix structure 12-190 on the fixed portion 12-F (including the housing 12-110, the base 12-120, the frame 12-150 and/or the circuit component 12-170) and/or the movable portion 12-M. In addition, although in the embodiments of the present disclosure, the matrix structure 12-190 is disposed as planar, however in some embodiments the matrix structure 12-190 may be disposed as curved (i.e. having a curvature). In some embodiments, the matrix structure 12-190 may be disposed on an element or portion that is made of metal.

Figure 8:
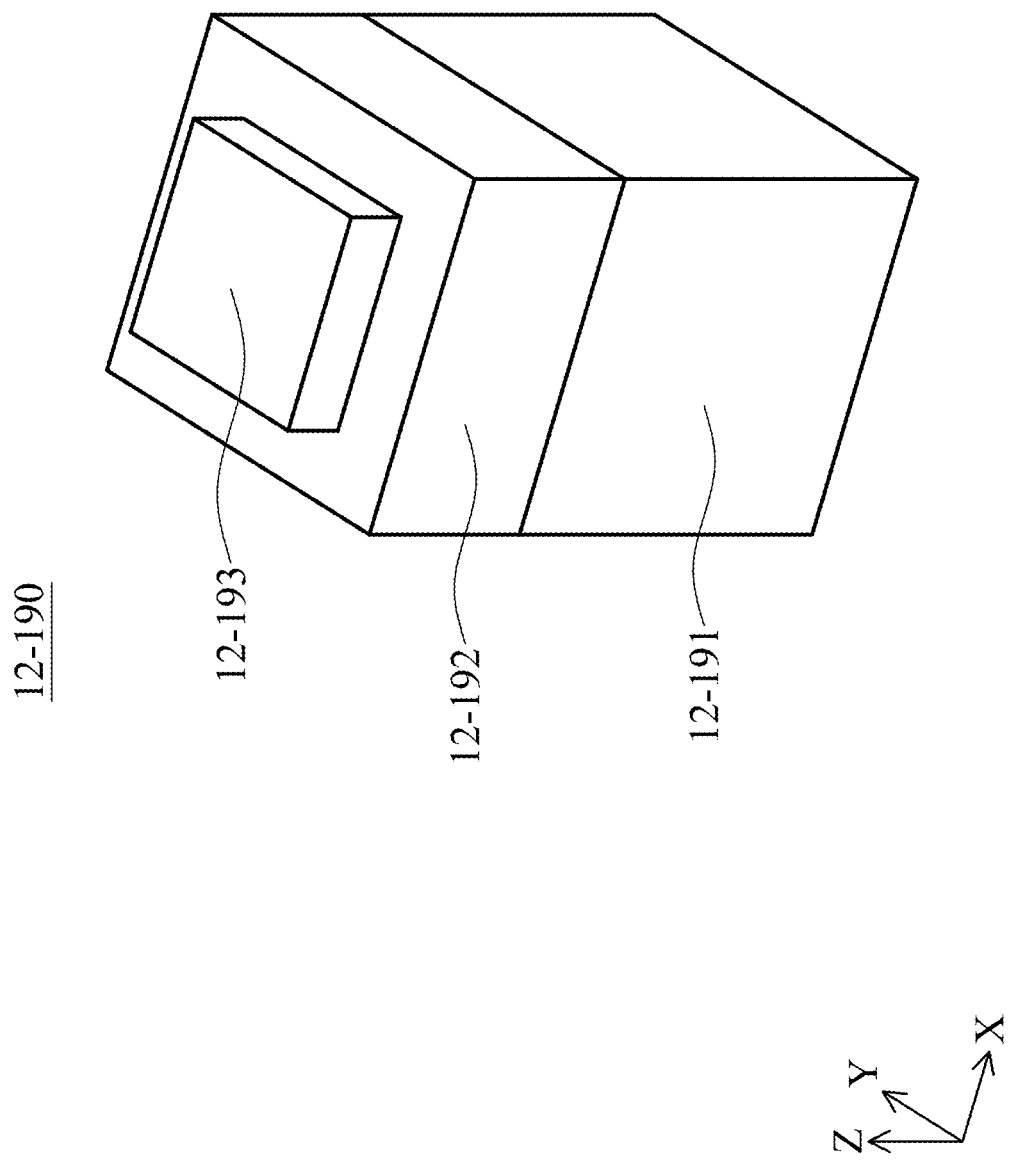
FIG. 8 is a schematic view illustrating a matrix structure in accordance with an embodiment of the present disclosure.

FIG. 8 is a schematic view illustrating the matrix structure 12-190 in accordance with an embodiment of the present disclosure. As shown in FIG. 8, the matrix structure 12-190 is multi-layered and includes a metallic layer 12-191, an insulating layer 12-192 and a protruding portion 12-193. The metallic layer 12-191 is the bottommost layer of the matrix structure 12-190. For example, the material of the metallic layer 12-191 includes gold (Au), silver (Ag), aluminum (Al), any other suitable metallic material or a combination thereof. The insulating layer 12-192 is formed on the metallic layer 12-191. For example, the material of the insulating layer 12-192 includes magnesium fluoride ($MgF_2$), silicon dioxide ($SiO_2$), any other suitable insulating material or a combination thereof. The protruding portion 12-193 is formed on the insulating layer 12-192, wherein the area of the protruding portion 12-193 on the horizontal plane (the X-Y plane) may be smaller than the area of the insulating layer 12-192 on the horizontal plane. That is, when viewed in a vertical direction, the insulating layer 12-192 may be exposed from the protruding portion 12-193. For example, the material of the protruding portion 12-193 includes gold (Au), silver (Ag), aluminum (Al), any other suitable metallic material or a combination thereof. In some embodiments, the metallic layer 12-191 and the protruding portion 12-193 may be formed of the same material. In some other embodiments, the metallic layer 12-191 and the protruding portion 12-193 may be formed of different materials.

Figure 9:
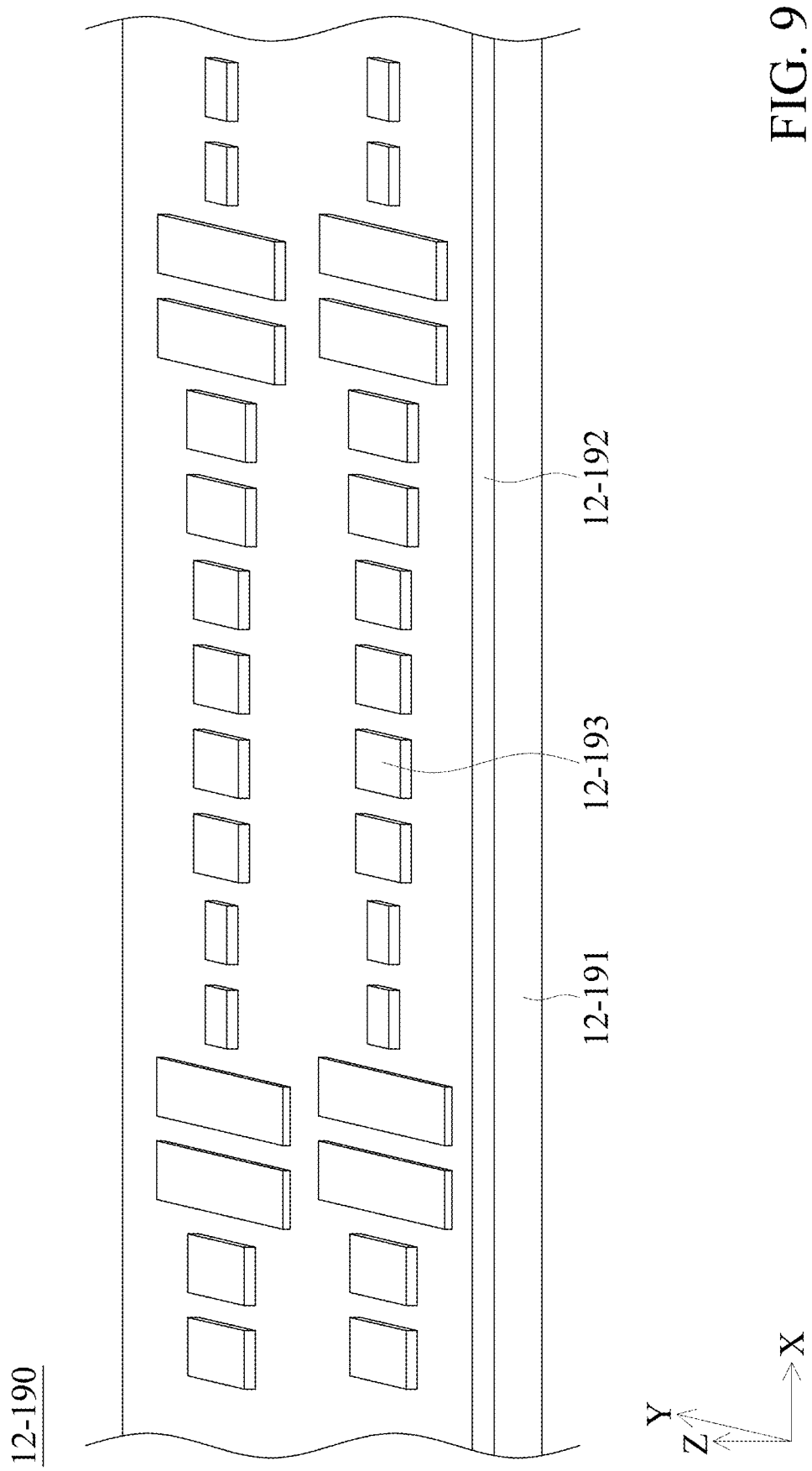
FIG. 9 is a perspective view illustrating the matrix structure in accordance with an embodiment of the present disclosure.

FIG. 9 is a perspective view illustrating the matrix structure 12-190 in accordance with an embodiment of the present disclosure. As shown in FIG. 9, the matrix structure 12-190 has a plurality of protruding portions 12-193 with different sizes. The protruding portions 12-193 are formed on the insulating layer 12-192. By means of arranging the protruding portions 12-193 in a particular manner, the surface plasmon resonance (SPR) generated by the matrix structure 12-190 may be tuned, such that the direction of the light reflected by the matrix structure 12-190 may be controlled. As a result, the possibility that the noise reaches the optical member 12-S may be further reduced, therefore preserving the image quality. It should be understood that the arrangement (such as the sizes or arrangement of each of the protruding portions 12-193) of the matrix structure 12-190 may be adjusted in response to light (e.g. visible light, infrared light, etc.) with certain range of wavelength. Therefore, the function to avoid the noise worsening the image quality may be achieved.

As set forth above, the embodiments of the present disclosure provide an optical member driving mechanism including a matrix structure that corresponds to the noise. By means of the arrangement of the matrix structure, the possibility that the noise reaches the optical member may be further reduced, therefore preserving the image quality. As a result, the optical member driving mechanism may be simplified and miniaturized. In addition, the matrix structure may be disposed with other anti-refection structures (such as barriers), further enhancing the preservation for high-quality image.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
    a first portion, connected to a first optical member, corresponding to a first light, wherein the first portion comprises a base, a housing disposed on the base, and a frame disposed between the base and the housing, the base has a barrier, and the frame has a light-shielding structure opposite to the barrier; and
    a matrix structure, disposed on the first portion, corresponding to a second light, wherein the first light is different from the second light,
    wherein the matrix structure comprises a regularly-arranged structure.

2. The optical member driving mechanism as claimed in claim 1, wherein a traveling direction of the first light is different from a traveling direction of the second light.

3. The optical member driving mechanism as claimed in claim 1, wherein the matrix structure is symmetric about an optical axis of the first optical member.

4. The optical member driving mechanism as claimed in claim 1, wherein the matrix structure is curved.

5. The optical member driving mechanism as claimed in claim 1, wherein the first portion has a fillet structure, and the matrix structure is disposed on the fillet structure.

6. An optical member driving, comprising:
    a first portion, connected to a first optical member, corresponding to a first light;
    a matrix structure, disposed on the first portion, corresponding to a second light, wherein the first light is different from the second light, wherein the matrix structure comprises a regularly-arranged structure;
    a second portion that is movable relative to the first portion;
    a driving assembly configured to drive the second portion to move relative to the first portion, wherein the driving assembly comprises a magnetic member on the first portion and a coil on the second portion; and
    another matrix structure disposed on the second portion.

7. The optical member driving mechanism as claimed in claim 1, wherein the second light is reflected by the matrix structure.

8. The optical member driving mechanism as claimed in claim 1, wherein the matrix structure comprises a multi-layered structure, and the multi-layered structure comprises a metallic material and an insulating material.

9. The optical member driving mechanism as claimed in claim 1, wherein a jagged structure is formed on the barrier or the light-shielding structure.

10. The optical member driving mechanism as claimed in claim 9, wherein the matrix structure is conformally disposed on the jagged structure.

11. The optical member driving mechanism as claimed in claim 1, wherein an opening is formed on a sidewall of the housing, and the barrier or the light-shielding structure is exposed in the opening when viewed in a direction perpendicular to the sidewall of the housing.

12. The optical member driving mechanism as claimed in claim 1, wherein the barrier has an upper surface and a cutting surface that intersects with the upper surface, a tapered structure is formed by the upper surface and the cutting surface, and the matrix structure is formed on the upper surface.

13. The optical member driving mechanism as claimed in claim 1, wherein the matrix structure comprises:
    a metallic layer;
    an insulating layer on the metallic layer; and
    a plurality of protruding portions on the insulating layer.

14. The optical member driving mechanism as claimed in claim 13, wherein the metallic layer comprises gold (Au), silver (Ag), aluminum (Al), or a combination thereof.

15. The optical member driving mechanism as claimed in claim 13, wherein the insulating layer comprises magnesium fluoride ($MgF_2$), silicon dioxide ($SiO_2$), or a combination thereof.

16. The optical member driving mechanism as claimed in claim 13, wherein the metallic layer and the plurality of protruding portions are formed of a same material.

17. The optical member driving mechanism as claimed in claim 13, wherein the metallic layer and the plurality of protruding portions are formed of different materials.

18. The optical member driving mechanism as claimed in claim 13, wherein the plurality of protruding portions have different sizes.

19. The optical member driving mechanism as claimed in claim 13, wherein a thickness of the metallic layer is different from a thickness of the insulating layer.

* * * * *